Dec. 31, 1957 J. E. GUTRIDGE ET AL 2,818,033
FREIGHT VEHICLE HOLDING DEVICE
Filed July 29, 1953 2 Sheets-Sheet 1
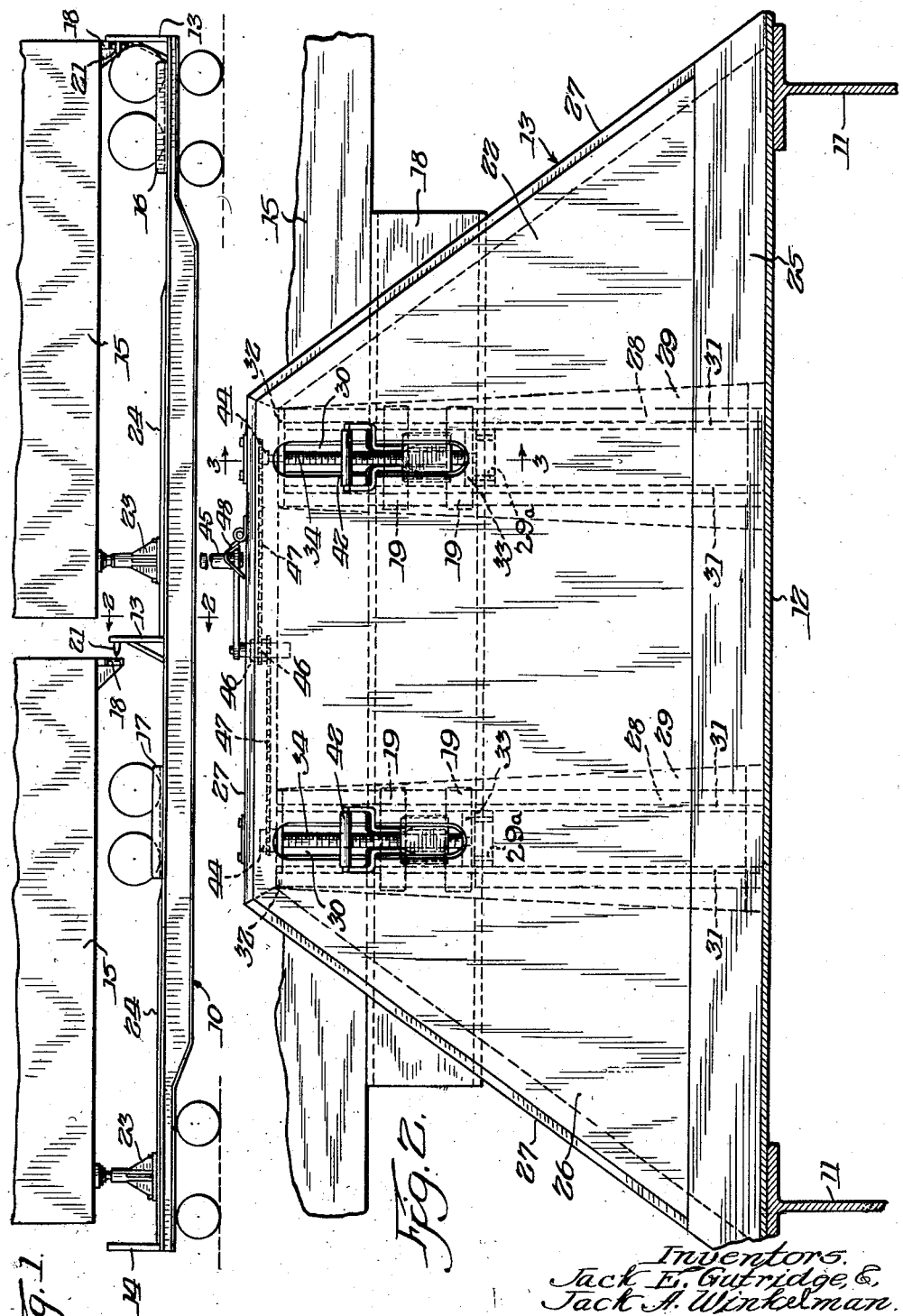
Inventors.
Jack E. Gutridge &
Jack A. Winkelman.
By Wayne Morris Russell
Atty.

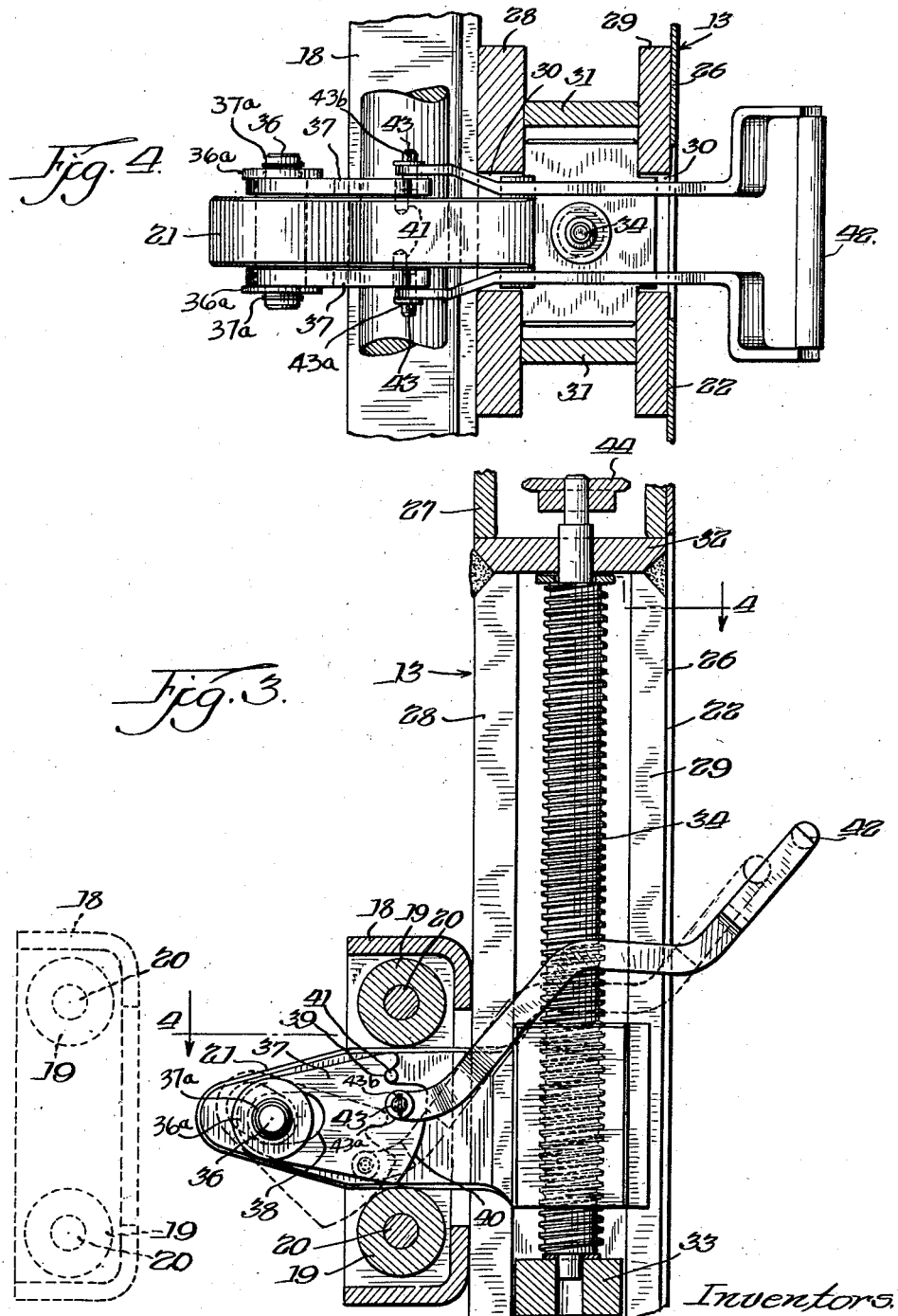

United States Patent Office 2,818,033
Patented Dec. 31, 1957

2,818,033

FREIGHT VEHICLE HOLDING DEVICE

Jack E. Gutridge, Munster, and Jack A. Winkelman, Hammond, Ind., assignors to Pullman-Standard Car Manufacturing Company, Chicago, Ill., a corporation of Delaware Application July 29, 1953, Serial No. 371,048

13 Claims. (Cl. 105—368)

This invention relates to freight vehicles and is primarily concerned with a holding device for holding a vehicle to be shipped in a stationary position on a freight vehicle.

The principal object of the invention is to provide a holding device for holding a vehicle to be shipped in a stationary position on a freight vehicle.

Another object of the invention is to provide a holding device which will prevent the vehicle being shipped from moving longitudinally on the freight vehicle.

Another object of the invention is to provide a holding device which will prevent vertical movement of the vehicle being shipped with respect to the freight vehicle.

An important object of the invention is to provide a holding device which is adjustable vertically so that it can be attached to vehicles being shipped having bodies of different heights.

A further object of the invention is to provide a holding device having a structure of novel construction.

More specifically the invention contemplates a holding device comprising a vertically disposed support secured to the freight vehicle and vertically disposed jack screws rotatably mounted in the support and horizontally disposed projections threaded on the jack screws and cams pivotally connected to the projections and handles connected to the cams and a crank operatively connected to the jack screws and the cams being adapted to engage one end of a vehicle being shipped to hold the vehicle in a stationary position on the freight vehicle and rotation of the crank causing vertical movement of the projections on the jack screws so that the projections and cams can be attached to shipped vehicles having bodies of different heights.

The foregoing and other objects of the invention are attained by the construction and arrangement illustrated in the accompanying drawings wherein:

Fig. 1 is a side elevational view of a railway flat car showing two truck trailers loaded thereon with the holding devices of the present invention holding the rear ends of the trailers on the car;

Fig. 2 is an elevational view of the holding device on the end of the car and a portion of the rear end of the adjacent truck trailer;

Fig. 3 is a vertical sectional view taken on the line 3—3 of Fig. 2 showing the holding device engaging a pair of rollers on the rear end of the trailer in solid lines and showing the channel and rollers mounted on the rear end of the trailer in dotted lines; and Fig. 4 is a sectional view taken on the line 4—4 of Fig. 3.

The invention proposes a holding device for holding one end of a vehicle to be shipped in a stationary position on a freight vehicle on which the vehicle is to be transported. The holding device comprises a vertically disposed support secured to the floor of the freight vehicle and a pair of vertically disposed spaced jack screws are rotatably mounted in the support and a horizontally disposed projection is threaded on each jack screw. A pin extends through each projection and a pair of cams are disposed on opposite faces of each projection and the cams have slots adapted to receive the pin and a handle is pivotally connected to each pair of cams. A crank is rotatably mounted in the support and is operatively connected to both jack screws. The vehicle to be shipped has a first pair of spaced rollers mounted on one end and a second pair of spaced rollers horizontally spaced from the first pair of rollers mounted on the same end of the vehicle. The crank is adapted to be rotated to move the projections vertically on the jack screws until the projections are opposite the space between each pair of rollers and then the vehicle is backed until each projection extends between the adjacent pair of rollers. Each handle is adapted to be moved in one direction causing the pair of cams to which the handle is connected to move into engagement with one of the adjacent pair of rollers and movement of each handle in the opposite direction causing its respective pair of cams to be released from the adjacent roller so that the rollers on the shipped vehicle can be moved off the projections on the holding device. Thus the projections prevent vertical movement of the shipped vehicle with respect to the freight vehicle and the cams and the projections prevent movement of the shipped vehicle longitudinally of the freight vehicle.

In the drawings, 10 generally designates a freight vehicle or railway flat car having the usual side sills 11 and a floor 12 disposed on the side sills. A holding device 13 extends across the width of the car at one end thereof and is secured to the car and an identical holding device extends across the width of the car at the center and is secured to the car and an end wall 14 extends across the width of the car at the other end. Two vehicles or truck trailers 15 are adapted to be carried by the car and each trailer has eight rear wheels, that is, it has a first pair of wheels disposed in front of a second pair of wheels at each side of the trailer adjacent the rear end. The trailers 15 are loaded on the car at a railroad terminal which has platforms disposed on opposite sides of the car substantially flush with the floor of the car. The trailers 15 are pulled to the railroad terminal by truck tractors and left on the platforms ready to be loaded on the car. Before loading the trailers 15 on the car they may be disposed on the platforms one on one side of the car and the other on the other side of the car where each is delivered by a truck tractor bringing it to the shipping point. Lift trucks are used to load the trailers on the car and these lift trucks are of the type that are movable both longitudinally and laterally of themselves. Where the trailers are to be loaded from opposite sides of the car a channel-shaped turntable 16 is positioned adjacent one side and one end of the car and pivotally mounted at its center to the floor of the car and an identical turntable 17 is positioned adjacent the other side of the car and spaced from the center of the car and pivotally mounted at its center to the floor. These turntables have a length and width sufficient to accommodate the two pairs of wheels at one side of a trailer.

A horizontally disposed member or channel 18 depends from the rear end of each trailer 15 and is fixedly secured to the trailer. Each channel 18 has two horizontally spaced rectangular-shaped openings and in each opening a pair of horizontally disposed spaced parallel rollers 19 are arranged one above the other and are rotatably mounted on shafts 20 which are fixedly secured to the channel as best shown in Figs. 2 and 3. To load one trailer on the car from the platform on one side of the car a lift truck engages the fifth wheel pin on the trailer and lifts the front end of the trailer and backs the rear end of the trailer onto the car directing the two pairs of wheels at one side of the trailer onto the turntable 16. The lift truck then moves the front end of the trailer onto the car and as the front end of the trailer is being moved onto the car the two pairs of wheels on the turntable 16 pivot with the turntable and the two pairs of wheels at the other side of the trailer roll on the floor of the car. Although the trailer is now on the car the rear end of the trailer is spaced from the holding device 13 at the end of the car. The lift truck then backs the trailer longitudinally of the car until a pair of horizontally disposed projections 21 on the holding device 13 project between the two pairs of rollers 19 on the trailer and the trailer continues to move backward until the channel 18 comes into contact with a vertically disposed support 22 on the holding device. The pair of mechanisms on the holding device 13 are then actuated to attach the rear end of the trailer to the holding device and these mechanisms and their operation will be described more in detail subsequently. The lift truck then lowers the front end of the trailer until the fifth wheel pin of the trailer is received by a fifth wheel stand 23 which is slidable longitudinally of the car in a pair of spaced guideways 24 extending longitudinally of the car. Thus the fifth wheel stand 23 can be moved to a position directly under the fifth wheel pin of the trailer regardless of the size or model of the trailer. The lift truck then backs off the car onto the platform and this completes the loading of one trailer on the car. To load the other trailer on the car from the platform on the other side of the car a lift truck lifts the front end of the trailer and backs the rear end of the trailer onto the car and the wheels at one side of the trailer onto the turntable 17. The lift truck then moves the front end of the trailer onto the car and then backs the trailer longitudinally of the car until the rear end of the trailer comes into engagement with the holding device 13 at the center of the car. The lift truck then lowers the front end of the trailer until it rests upon the fifth wheel stand 23 which is slidable longitudinally of the car in the spaced guideways 24 which extend longitudinally of the car to complete the loading of the second trailer on the car and then backs off the car onto the platform.

Since the holding devices 13 at the end and center of the car are substantially identical only the holding device at the end of the car will be described. The holding device 13 at the end of the car has the support 22 and this support is made up of an L-shaped horizontally disposed framing member 25 having its horizontal flange secured to the floor 12 of the car and a vertically disposed trapezoidal-shaped metal cover plate 26 has one edge welded to the edge of the vertical flange of the framing member and inverted channel-shaped framing members 27 border the other three edges of the plate and each framing member 27 has one flange bearing against the face of the cover plate nearest to the center of the car and welded thereto. The support 22 is also made up of a pair of vertically disposed spaced hollow structures and each of the hollow structures is comprised of a pair of vertically disposed spaced plates 28 and 29 disposed generally parallel with the cover plate 26 and positioned on the floor 12 of the car and welded to the floor and the plate 29 is welded to the cover plate. The plate 28 is rectangular in shape and its lower portion is bent away from the cover plate 26 at a location adjacent its center. The plate 29 is in the shape of a trapezoid, that is, its width at its bottom edge is greater than the width at its top edge. The plates 28 and 29 and the cover plate 26 are provided with aligned vertically extending slots 30. The support 22 also has a pair of vertically disposed spaced plates 31 positioned between the plates 28 and 29 and welded to these plates. The plates 31 are welded to the floor 12 and to the horizontal flange of the framing member 25 and are cut away so as to conform to the shape of the horizontal flange of the framing member. The upper portion of each plate 31 is rectangular in shape while the lower portion is triangular in shape so that the plate conforms to the bend in the plate 28. A cap 32 is welded to the top edges of the plates 28, 29, and 31.

A number of lugs 29a on the same level are welded to the inner faces of the plates 29 and 31 and an apertured block 33 is supported on these lugs or the block 33 might be welded directly to the plates 28, 29 and 31. A mechanism is mounted in each hollow structure and each mechanism comprises a vertically disposed jack screw 34 having unthreaded extensions projecting from its ends and these extensions are rotatably mounted in the block 33 and the cap 32. The horizontally disposed projection 21 is positioned in the slots 30 in the plates 28 and 29 and the projection has a threaded opening adjacent one end receiving the jack screw 34 and the projection is tapered inwardly from its other end and is adapted to project between the adjacent pair of rollers 19 on the trailer. A pin 36 is arranged transversely of the projection 21 and extends through the projection adjacent its free end. A pair of cams 37 are positioned on opposite faces of the projection 21 and each cam is provided with a slot 38 adapted to receive the pin 36. Washers 36a are mounted on the pin 36 and bear against the outer faces of the cams 37 and snap rings 37a are disposed in grooves in the pin 36 and bear against the outer faces of the washers. Each cam 37 is provided with a notch 39 and a cam surface 40. A pair of studs 41 extend from opposite faces of the projection 21 and are pressed into holes in the projection. A handle 42 extends through the slots 30 in the plates 28 and 29 and the sheet 26 and the handle is made up of two irregularly shaped legs disposed on opposite faces of the jack screw 34 and a hand grip extending between the legs and welded to them. A pivot pin 43 is pressed into a hole in each cam 37 and extends from the outer face of the cam. The pivot pins 43 project through holes in the legs of the handle 42 and washers 43a are mounted on the pins and these washers bear against the outer surface of the legs on the handle and keys 43b project through openings in the pins and bear against the outer faces of the washers. Thus it will be seen that the handle 42 is pivotally connected to the pair of cams 37. A gear wheel 44 is fixedly secured to the upper end of the upper extension on each jack screw 34 and is disposed between the horizontal framing member 27 and the cap 32. A crank 45 has a shaft portion rotatably mounted in the horizontal framing member 27 and in an angle secured to the framing member and the sheet 26 midway between the jack screws 34. A pair of spaced gear wheels 46 are fixedly secured on the shaft portion of the crank. An endless chain 47 is mounted on the gear wheel 44 on one jack screw 34 and on one gear wheel 46 on the crank 45 and another endless chain 47 is mounted on the gear wheel 44 on the other jack screw 34 and on the other gear wheel 46 on the crank. A bracket 48 is comprised of three integral arms in the form of a Y-shape and the free end of one arm of the bracket is pivotally connected to the horizontal framing member 27 and the other two arms of the bracket are bent at a right angle intermediate their ends and are adapted to enclose the hand grip portion of the crank 45 to maintain the crank in a locked position.

Assuming that the front end of the trailer 15 on the right hand side of Fig. 1 has just been moved onto the car a lift truck backs the trailer longitudinally of the car until the rear end of the trailer is spaced a small distance from the projections 21 at a position as shown by the dotted line representation of the channel 18 and rollers 19 in Fig. 3. The operator then turns the crank 45 so that the projections 21 move either upwardly or downwardly on the jack screws 34 in the slots 30 in the plates 28 and 29 until each projection is opposite the space between the adjacent pair of rollers 19. The lift truck then backs the trailer 15 until each projection 21 has been received between the adjacent pair of rollers 19 and the web of the channel 18 bears against the plates 28 on the support 22. The operator then moves the handle 42 on each mechanism downwardly so that the respective pair of cams 37 through their slots 38 guided by the adjacent pin 36 move in a horizontal direction away from the support 22 and the notches in the cams move off the studs 41. Continued downward movement of the handle 42 causes the ends of the slots 38 in the adjacent pair of cams 37 to bear against the adjacent pin 36 and the pair of cams pivot downwardly about the pin and engage the lower one of the adjacent pair of rollers 19 as best shown by the dotted line representation of the cams and their connected handle in Fig. 3. The holding device 13 at the end of the car is now attached to the trailer and each projection 21 by having a close rolling fit between the adjacent pair of rollers 19 will prevent any vertical movement of the rear end of the trailer and each pair of cams 37 by bearing against the lower one of the adjacent pair of rollers will prevent any movement of the trailer longitudinally of the car.

To unload the trailer at the right hand side of Fig. 1 from the car the handle 42 on each mechanism is pulled upwardly causing the adjacent pair of cams 37 to pivot upwardly about the adjacent pin 36. Continued upward movement of the handle 42 causes the pair of cams 37 through their slots 38 riding on the adjacent pin 36 to move toward the support 22 to a position between the adjacent pair of rollers 19 until the studs 41 engage the notches 39 in the cams. A lift truck moves onto the car and lifts the front end of the trailer off the fifth wheel stand 23 and moves the trailer forward until the two pairs of rollers 19 have moved off the projections 21. The lift truck then moves the front end of the trailer 15 off the car onto the platform at one side of the car with the wheels at one side of the trailer pivoting with the turntable 16. The lift truck then pulls the rear end of the trailer off the car onto the platform. The other trailer may be unloaded from the car onto the platform at the other side of the car in a similar manner.

From the foregoing it will be seen that there has been provided a holding device which prevents longitudinal movement of the shipped vehicle on the freight vehicle and vertical movement of one end of the shipped vehicle on the freight vehicle and is vertically adjustable so as to be capable of being attached to shipped vehicles having bodies of different heights.

What is claimed is:

1. In a freight vehicle adapted to carry a vehicle having a member mounted thereon, a floor, a vertically disposed support secured to the floor, a horizontally disposed projection carried by the support, a cam pivotally connected to the projection, and a handle connected to the cam, movement of the handle in one direction causing the cam to pivot against the member.

2. In a freight vehicle adapted to carry a vehicle having a member mounted thereon, a floor, a vertically disposed support secured to the floor, a horizontally disposed projection carried by the support, a pin carried by the projection, a cam provided with a slot adapted to receive the pin, and a handle connected to the cam, movement of the handle in one direction causing the cam to move away from the support and to pivot against the member.

3. In a freight vehicle adapted to carry a vehicle having a member mounted thereon, a floor, a vertically disposed support secured to the floor, a horizontally disposed projection carried by the support and being tapered inwardly from its free end, a pin carried by the projection adjacent the free end thereof, a cam provided with a slot adapted to receive the pin, and a handle connected to the cam, movement of the handle in one direction causing the cam to move away from the support and to pivot against the member.

4. In a freight vehicle adapted to carry a vehicle having a member mounted thereon, a floor, a vertically disposed support secured to the floor, a horizontally disposed projection carried by the support, a pin carried by the projection, a cam provided with a slot adapted to receive the pin and provided with a notch, a stud secured to the projection, and a handle connected to the cam, movement of the handle in one direction causing the cam to move away from the support and to pivot against the member and movement of the handle in the opposite direction causing the cam to pivot in the opposite direction and to move toward the support until the stud engages the notch in the cam.

5. In a freight vehicle adapted to carry a vehicle having a member mounted thereon, a floor, a vertically disposed support secured to the floor, a vertically disposed jack screw rotatably mounted on the support, a horizontally disposed projection having a threaded opening adjacent one end receiving the jack screw, a pin disposed adjacent the other end of the projection and secured to the projection, a cam provided with a slot adapted to receive the pin, and a handle connected to the cam, movement of the handle in one direction causing the cam to move away from the support and to pivot against the member and rotative movement of the jack screw causing the projection to move upwardly or downwardly on the screw.

6. In a freight vehicle adapted to carry a vehicle having a member provided with an opening mounted thereon, a floor, a vertically disposed support secured to the floor, and a horizontally disposed projection secured to the support and adapted to project into the opening in the member to prevent vertical movement of the vehicle with respect to the freight vehicle.

7. In a freight vehicle adapted to carry a vehicle having a member provided with an opening mounted thereon, a floor, a vertically disposed support secured to the floor, a vertically disposed jack screw rotatably mounted in the support, and a horizontally disposed projection having a threaded opening receiving the jack screw and rotation of the jack screw being adapted to move the projection vertically to a position opposite the opening in the member on the vehicle and the projection being adapted to project into the opening in the member to prevent vertical movement of the vehicle with respect to the freight vehicle.

8. In a freight vehicle adapted to carry a vehicle having a horizontally disposed member provided with a pair of spaced openings mounted thereon, a floor, a vertically disposed support secured to the floor, a pair of vertically disposed spaced jack screws rotatably mounted in the support, a horizontally disposed projection mounted on each jack screw and each projection having a threaded opening receiving its respective jack screw, and a crank rotatably mounted in the support and operatively connected to the jack screws and turning of the crank being adapted to move the projections vertically on the jack screws to a position opposite the adjacent opening in the member on the vehicle and each projection being adapted to project into the adjacent opening in the member to prevent vertical movement of the vehicle with respect to the freight vehicle.

9. In a freight vehicle adapted to carry a vehicle having a member provided with an opening mounted thereon, a floor, a vertically disposed support secured to the floor and provided with a vertically extending slot, a vertically disposed jack screw rotatably mounted in the support in the region of the slot, a horizontally disposed projection positioned in the slot in the support and having a threaded opening receiving the jack screw and adapted to project into the opening in the member, a pin extending through the projection adjacent the free end thereof, a pair of cams positioned on opposite faces of the projection and each having a slot adapted to receive the pin, and a handle extending through the slot in the support and pivotally connected to the cams, downward movement of the handle causing the cams to move away from the support and to pivot downwardly about the pin and engage the member and upward movement of the handle causing the cams to pivot upwardly about the pin and to move toward the support and upon rotation of the jack screw the projection being adapted to move upwardly or downwardly on the screw in the slot in the support.

10. In a freight vehicle adapted to carry a vehicle having a horizontally disposed member provided with a pair of spaced openings mounted thereon, a floor, a vertically disposed support secured to the floor, a pair of spaced mechanisms mounted on the support and each of the mechanisms comprising a vertically disposed jack screw rotatably mounted on the support and a horizontally disposed projection having a threaded opening receiving the jack screw and being adapted to project into the adjacent opening in the member and a cam pivotally connected to the projection and a handle connected to the cam and movement of the handle in one direction causing the cam to pivot into engagement with the member, and a crank rotatably mounted in the support and operatively connected to the jack screws, upon turning of the crank the projections being adapted to move upwardly or downwardly on the jack screws.

11. In a freight vehicle adapted to carry a vehicle having a horizontally disposed member provided with a pair of spaced openings mounted thereon, a floor, a vertically disposed support secured to the floor, a pair of spaced mechanisms mounted on the support and each of the mechanisms comprising a vertically disposed jack screw rotatably mounted on the support and a horizontally disposed projection having a threaded opening receiving the jack screw and being adapted to project into the adjacent opening in the member and a cam pivotally connected to the projection and a handle connected to the cam and movement of the handle in one direction causing the cam to pivot into engagement with the member, a crank rotatably mounted in the support and operatively connected to the jack screws and upon turning of the crank, the projections being adapted to move upwardly or downwardly on the jack screws, and a bracket pivotally connected to the support and adapted to engage the crank to maintain the crank in a locked position.

12. In a freight vehicle adapted to carry a vehicle having a horizontally disposed member provided with a pair of spaced openings mounted thereon, a floor, a vertically disposed support secured to the floor and provided with a pair of spaced vertically extending slots, a pair of mechanisms mounted in the support and each mechanism being in the region of one of the slots in the support and comprising a vertically disposed jack screw rotatably mounted in the support and a horizontally disposed projection positioned in the adjacent slot in the support and having a threaded opening receiving the jack screw and adapted to project into the adjacent opening in the member and a pin extending through the projection adjacent the free end thereof and a pair of cams positioned on opposite faces of the projection and each cam being provided with a slot adapted to receive the pin and a handle extending through the slot in the support and pivotally connected to the cams and downward movement of the handle causing the cams to move away from the support and to pivot downwardly about the pin and engage the member and upward movement of the handle causing the cams to pivot upwardly about the pin and to move toward the support, and a crank rotatably mounted in the support and operatively connected to the jack screws, upon turning of the crank the projections being adapted to move upwardly or downwardly on the jack screws in the slots in the support.

13. In a freight vehicle, a floor, a horizontally disposed framing member secured to the floor, a vertically disposed cover plate having one edge secured to the framing member, framing members secured to the other edges of the cover plate, and a pair of vertically disposed spaced hollow structures positioned on the floor against the cover plate and each of the hollow structures comprising a first pair of vertically disposed spaced plates positioned on the floor and one of the plates being secured to the cover plate and the first pair of plates and the cover plate being provided with aligned vertically extending slots and a second pair of vertically disposed spaced plates positioned on the floor between the first pair of plates and secured to the first pair of plates.

References Cited in the file of this patent

UNITED STATES PATENTS

| 1,675,512 | Otis | July 3, 1928 |
| 2,170,581 | West et al. | Aug. 22, 1939 |
| 2,503,368 | Willetts | Apr. 11, 1950 |
| 2,567,658 | Stough | Sept. 11, 1951 |